United States Patent

Olivier et al.

[11] Patent Number: 6,016,286
[45] Date of Patent: Jan. 18, 2000

[54] DEPTH CONTROL DEVICE FOR AN UNDERWATER CABLE

[75] Inventors: André W. Olivier, River Ridge; Bryant G. Ragan, Metairie; James T. Cronvich, Harahan, all of La.

[73] Assignee: Input/Output, Inc., Stafford, Tex.

[21] Appl. No.: 09/094,487

[22] Filed: Jun. 10, 1998

Related U.S. Application Data

[60] Provisional application No. 60/049,450, Jun. 12, 1997.

[51] Int. Cl.[7] ....................................................... G01V 1/38
[52] U.S. Cl. .............................. 367/17; 367/16; 114/245; 118/110
[58] Field of Search ..................... 367/16, 17; 114/245; 118/110

[56] References Cited

U.S. PATENT DOCUMENTS

| | | |
|---|---|---|
| 3,434,446 | 3/1969 | Cole . |
| 3,440,992 | 4/1969 | Chance . |
| 3,531,761 | 9/1970 | Tickell et al. . |
| 3,605,674 | 9/1971 | Weese . |
| 3,611,975 | 10/1971 | Ashbrook . |
| 3,931,608 | 1/1976 | Cole . |
| 4,222,340 | 9/1980 | Cole . |
| 4,290,124 | 9/1981 | Cole . |
| 4,709,355 | 11/1987 | Woods et al. . |
| 4,711,194 | 12/1987 | Fowler . |
| 5,529,011 | 6/1996 | Williams, Jr. . |
| 5,619,474 | 4/1997 | Kuche . |

*Primary Examiner*—Christine K. Oda
*Assistant Examiner*—Anthony Jolly
*Attorney, Agent, or Firm*—Leydig, Voit & Mayer, Ltd.

[57] ABSTRACT

A depth control device for an underwater cable includes a rotary actuator having a rotating output shaft connected to a swash plate. Rotation of the swash plate by the actuator causes a rocker arm to pivot about an axis transverse to the axis of the output shaft. The rocker arm is drivingly connected to a drive shaft for rotating wings about their pitch axes. The pitch axes of the wings can be perpendicular to and intersecting the axis of the actuator output shaft, enabling the depth control device to be extremely compact.

25 Claims, 11 Drawing Sheets

DEPTH CONTROL DEVICE FOR AN UNDERWATER CABLE

REFERENCE TO RELATED APPLICATIONS

This application claims the benefit of United States Provisional Application Ser. No. 60/049,450 filed on Jun. 12, 1997.

BACKGROUND OF THE INVENTION

1. Field of the Invention

This invention relates to a depth control device for use with an underwater cable, such as one used in seismic testing.

2. Description of the Related Art

In marine seismic exploration, a cable, commonly referred to as a streamer cable, is towed underwater by a surface vessel. An array of hydrophones is mounted in or attached to the cable, and an acoustic source or gun is fired to force an impulse of compressed air into the water, creating a bubble. The collapse of the bubble generates acoustic pulses that radiate through the water and into the earth. Reflections of the pulses off geologic structures beneath the sea floor are picked up by the hydrophones, and data representing the detected reflections are transmitted to the surface vessel. By analyzing the reflections, it is possible to discover subsea formations of oil or gas.

It is desirable to accurately control the, depth of the cable as it is being towed through the water. For this purpose, depth control devices, commonly referred to as "cable leveling birds" because they bear some visual resemblance to water fowl, are attached to the cable at intervals along its length. The depth control devices are equipped with adjustable diving planes, generally referred to as wings, each having a pitch axis about which it can be pivoted by motors in the depth control devices to adjust the lift generated by the wings so as to maintain the cable at a desired depth.

In a typical depth control device, the force for rotating the wings about their pitch axes is provided by an electric motor coupled to the wings in various manners. For example, the motor may have an output shaft which rotates a lead screw, which in turn pivots a lever drivingly connected to the wings. With such an arrangement, the axis of the output shaft of the motor ends up being located in a different plane from the pitch axes of the wings, e.g., the wings may have to be mounted either above or below a housing containing the motor. This arrangement is not ideal because disposing the motor output shaft and the pitch axes in different planes increases the height of the depth control device, resulting in increased drag, vibrations, and hydrodynamic noise. The increased drag increases the power required to tow the underwater cable through the water, while the increased vibrations and hydrodynamic noise can introduce errors into the acoustic measurements being made by the underwater cable.

SUMMARY OF THE INVENTION

The present invention provides a depth control device in which the pitch axes of the wings can be coplanar with the rotational axis of a motor for rotating the wings, resulting in a structure of low drag and low noise.

The present invention also provides a depth control device which has good impact resistance.

The present invention further provides a depth control device which is easy to assemble and modify.

The present invention additionally provides a depth control device having a modular drive mechanism which can be easily replaced by a drive mechanism having different operating characteristics but which is capable of being used with the same type of wings.

The present invention also provides a depth control device having a reliable yet simple arrangement for sensing the pitch angle of the wings of the depth control device.

The present invention further provides a cable arrangement including an underwater cable and a depth control device according to the present invention.

According to one form of the present invention, a depth control device may include a rotary actuator having a rotating output shaft. A swash plate having a contact surface is rotated by the output shaft. One or more push rods are disposed between the contact surface of the swash plate and a rocker arm such that when the swash plate is rotated, it exerts an axial force on the push rods, causing the push rods to translate and thereby pivot the rocker arm. One or more wings are operatively associated with the rocker arm such that pivoting of the rocker arm about its rotational axis pivots the wings about their pitch axes to change their pitch angles. By changing the pitch angles of the wings, the depth control device can exert a force on an underwater cable to adjust the depth of the cable in the water. The term pitch angle here refers to the rotational angle of a wing measured about its pitch axis with respect to any arbitrary reference rotational position of the wing. For convenience, the reference rotational position may be selected so that the pitch angle is equal to the angle of attack of the wings, but the pitch angle may instead differ from the angle of attack by a predetermined value.

According to another form of the invention, a depth control device for an underwater cable may include first and second wings and a drive shaft extending along a straight line between the first and second wings and having a rotational axis. An actuator having a rotating output shaft is operatively associated with the drive shaft for rotating the drive shaft about its rotational axis. The output shaft has a rotational axis intersecting the rotational axis of the drive shaft, whereby the height of the depth control device can be reduced, resulting in less drag, lower vibrations, and lower hydrodynamic noise of the depth control device.

According to still another form of the invention, a depth control device for an underwater cable may include a body, a wing supported by the body for rotation about a pitch axis, an actuator for rotating the wing about the pitch axis, and a magnet and a Hall effect sensor magnetically coupled to each other. One of the magnet and the Hall effect sensor is movably supported with respect to the body so as to move in synchrony with the wing as the wing rotates about the pitch axis, and the other of the magnet and the Hall effect sensor is stationary with respect to the body.

According to yet another form of the present invention, an underwater cable arrangement includes a cable and a depth control device attached to the cable. In a preferred embodiment, the pitch axes of the wings intersect and are perpendicular to the axis of the output shaft of the actuator. For example, the pitch axes may be coplanar with the axis of the output shaft.

In a preferred embodiment, the actuator, the swash plate, and the rocker arm are part of a modular assembly which is detachably mounted in a hollow body of the depth control device and is detachably connected to a drive shaft for the wings, enabling the assembly to be used with different wings.

DESCRIPTION OF PREFERRED EMBODIMENTS

Figure 1:
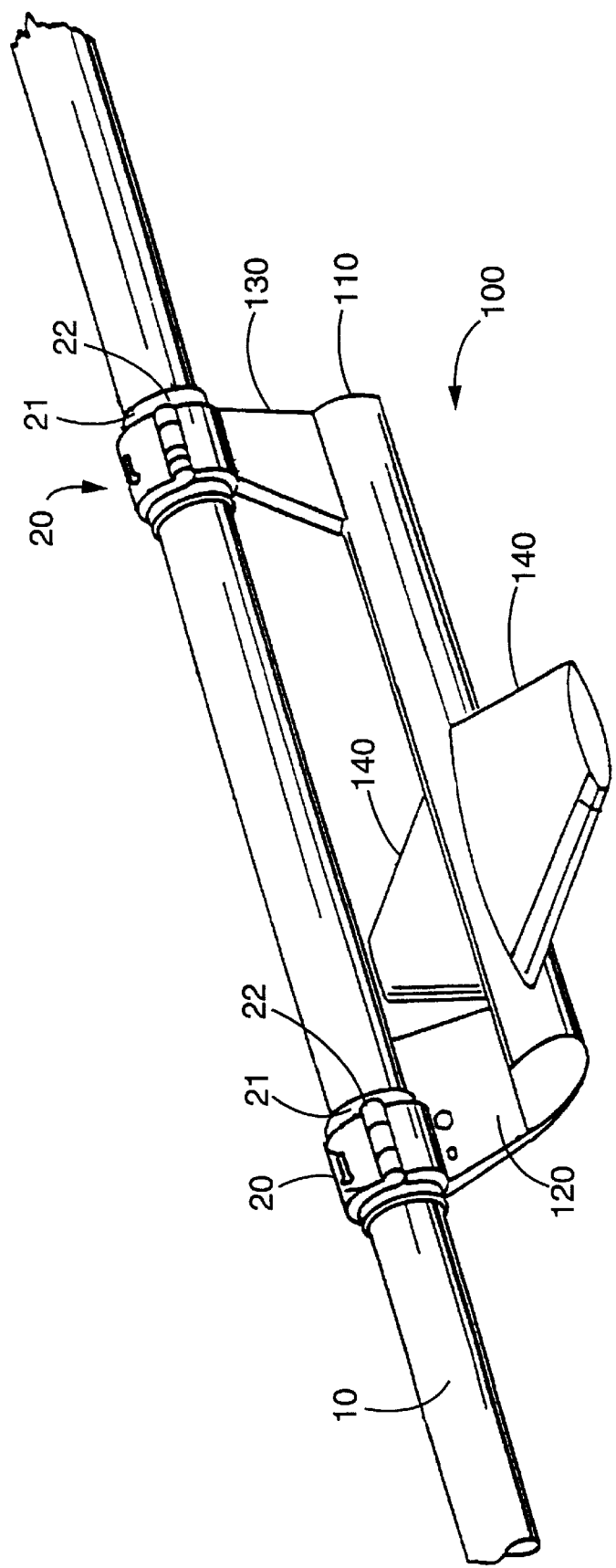
FIG. 1 is a perspective view of an embodiment of a depth control device according to the present invention installed on an underwater cable.

FIG. 1 illustrates an embodiment of a depth control device 100 according to the present invention installed on an underwater cable 10 for seismic exploration. During use, the cable 10 is towed through the water to the left in the figure by an unillustrated vessel. The depth control device 100 can be mounted on the cable 10 in any manner which enables the depth control device 100 to exert an upwards or downwards force on the cable 10 to adjust the depth of the cable 10 in the water. In the present embodiment, the depth control device 100 is suspended beneath the cable 10, but it may be disposed in other locations, such as above the cable 10, on the sides of the cable 10, or coaxially in-line with or surrounding the cable 10. A variety of other unillustrated components may be attached to the cable 10, such as heading sensors, hydrophones, acoustic ranging devices, cable retrieval devices, buoyancy adjusting equipment, and side scan sonar equipment. The depth control device 100 includes a body 110, a pair of arms 120, 130 connecting the body 110 to the cable 10, and a pair of wings 140 pivotably mounted on the body 110 for pivoting about a corresponding pitch axis to control its pitch angle. In the present embodiment, the pitch axes of the two wings 140 are aligned with each other. The pitch angle of each wing 140 is its rotational angle measured about its pitch axis with respect to a reference rotational position. In the present embodiment, the reference rotational position having a pitch angle of 0° is one in which the chord of each wing 140 is parallel to the axis of the cable 10, so when the cable 10 is moving in its lengthwise direction, the pitch angle will be equal to the angle of attack of the wings 140. However, the pitch angle may differ from the angle of attack, such as being offset from the angle of attack by a constant value. The pitch angle of the wings 140 can preferably be controlled over a sufficient range to enable the wings 140 to produce no lift, an upwards lift which urges the cable 10 upwards, or a negative lift which urges the cable 10 downwards, although the wings 140 may have a smaller range of pivoting. In the present embodiment, the pitch angle (and angle of attack) can be continuously varied between +15° and −15°. In addition to the wings 140, the depth control device 100 may include one or more other wings for use in steering the cable 10 horizontally through the water. Furthermore, the depth control device 100 may be equipped with one or more additional sets of wings of the same or different structure spaced from the first set of wings 140. An unillustrated depth sensor for sensing the depth of the cable 10 is mounted in or in the vicinity of the depth control device 100, such as in the cable 10 or in one of the arms 120, 130 of the depth control device 100. The pitch angle of the wings 140 will usually be automatically adjusted based on the output of the depth sensor so as to maintain the cable 10 at a desired depth in the water.

The depth control device 100 can be attached to the cable 10 in a variety of manners. Preferably, it is attached in such a manner that the body 110 of the depth control device 100 automatically remains directly below the cable 10, i.e., plumb with respect to the cable 10, with the pitch axes of the wings 140 substantially horizontal even when the cable 10 twists about its axis so that the depth control device 100 can exert a vertical force on the cable 10 regardless of the orientation of the cable 10. If the depth control device 100 is negatively buoyant, it can be rotatably connected to the cable 10 so as to automatically assume a position directly beneath the cable 10 under the force of gravity. To assist the depth control device 100 in assuming a position in which it is plumb with respect to the cable 10, a flotation chamber may be attached to the depth control device 100 on the upper side of the cable 10, an arrangement which is conventional in depth control devices. The flotation chamber, which has positive buoyancy, assumes a position directly above the cable 10 and exerts a torque on the depth control device 100 about the cable 10 to maintain the depth control device 100 directly below the cable 10. In this embodiment, the depth control device 100 is rotatably attached to the cable 10 by connectors 20 including an inner sleeve 21 secured to the exterior of the cable 10 and an outer sleeve 22 rotatably mounted on the inner sleeve 21 and secured to one of the arms 120, 130. Preferably, the outer sleeve 22 is readily detachable from the inner sleeve 21 to enable the depth control device 100 to be easily mounted on and disconnected from the cable 10. A particularly suitable type of connector for use in the present invention is described in U.S. Pat. No. 5,529,011 by Williams, Jr. entitled "Connector for Underwater Cables", although any other type of connector enabling the depth control device to rotate with respect to the cable 10 may be used.

Figure 2:
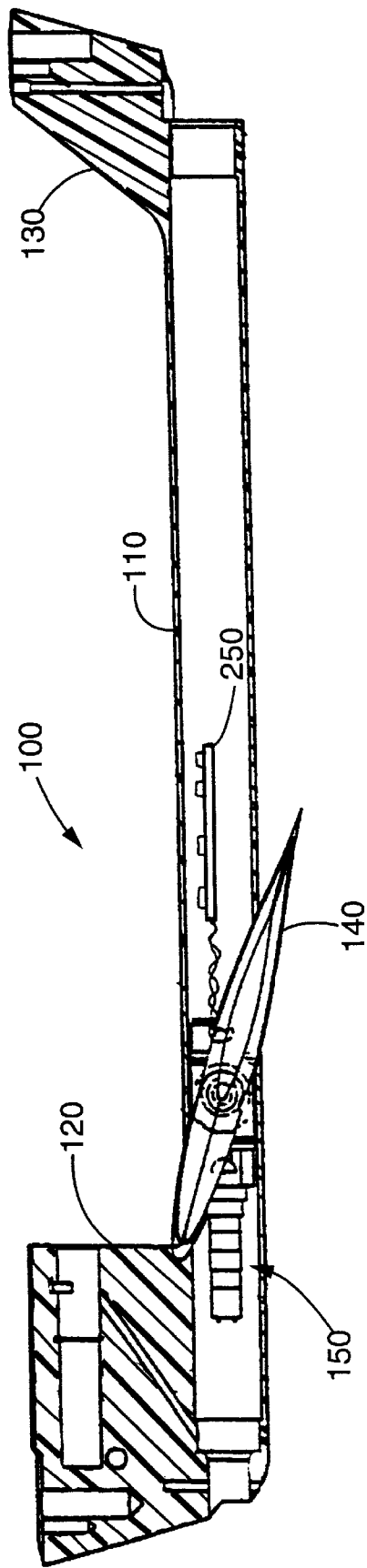
FIG. 2 is a longitudinal cross section of the depth control device of FIG. 1.

FIG. 2 is a longitudinal cross section of the depth control device 100 of FIG. 1, the left end in the figure being the front end as the device 100 is towed through the water. The body 110 may have any shape which enables it to support the wings 140 and equipment for adjusting the pitch angle of the wings 140. Preferably, the body 110 is a streamlined member, and in the present embodiment it is in the shape of an elongated hollow tube. The interior of the body 110 may be permanently closed, but preferably the body 110 is capable of being opened when desired to enable components to be readily replaced or serviced. In the present embodiment, the body 110 has an opening at one or both lengthwise ends into which various components can be inserted. After insertion of the components, the openings are sealed in a watertight manner by suitable closures. The arms 120, 130 may include sealable cavities for housing a variety of unillustrated components and passages leading between the cavities and the body 110. For example, the arms may include cavities for latch mechanisms for detachably connecting the arms to the connectors 20, or a cavity for a depth sensor or other electronic equipment. The body 110 and the arms 120, 130 may be made of any materials compatible with the environment in which the depth control device 100 operates, with impact resistant materials being particularly suitable.

Figure 3:
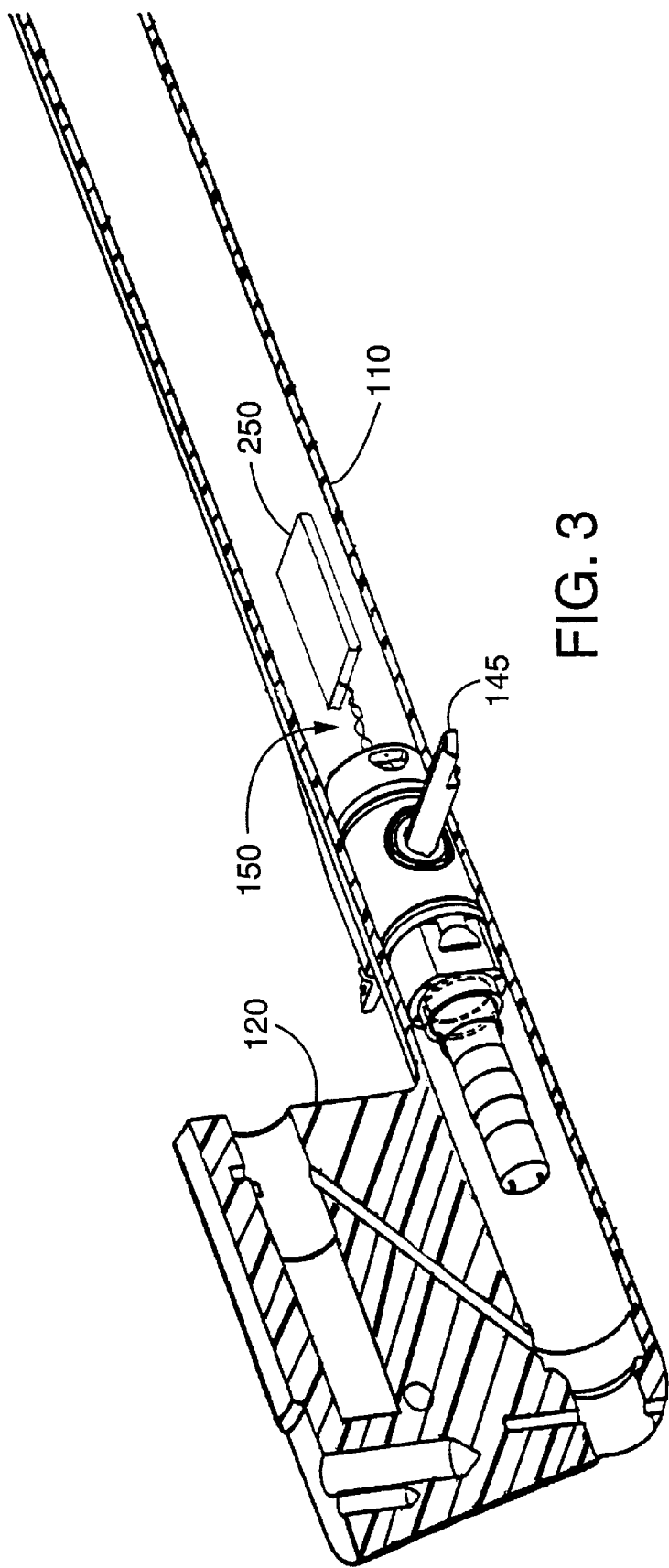
FIG. 3 is a cutaway perspective view of the front portion of the embodiment of FIG. 1.

FIG. 3 is a cutaway isometric view of the front end of the depth control device 100 with the wings 140 removed. As shown in the figure, the body 110 houses a wing actuator assembly 150 for rotating the wings 140 about their pitch axes to attain desired pitch angles. The actuator assembly 150 is drivingly connected to the wings 140 by a drive shaft 145 which passes through corresponding holes in the body 110 of the depth control device 100 and which preferably is detachable from the actuator assembly 150. For simplicity, the drive shaft 145 is preferably linear, although it is possible for it to have a crank shape or other nonlinear shape. When the pitch axes of the wings 140 are coaxial, it is convenient to employ a single drive shaft 145 for both wings 140, as in the present embodiment, but it is also possible to employ a separate drive shaft for each wing. Preferably, the wings 140 are detachable from the drive shaft 145. The actuator assembly 150 is a module which is not restricted to use with a specific set of wings 140. If the wings 140 are removed from the drive shaft 145 and the drive shaft 145 is withdrawn from the body 110, the actuator assembly 150 can be removed from the body 110 through one of the ends of the body 110 and replaced with another actuator assembly 150 having different operating characteristics, such as a different range of rotation or a different response time. Conversely, since the wings 140 are removable from the drive shaft 145, a single actuator assembly 150 can be used with a variety of different wings 140. In addition to the actuator assembly 150, the body 110 may house various other components, such as a control equipment for controlling the operation of the actuator assembly 150.

Figure 4:
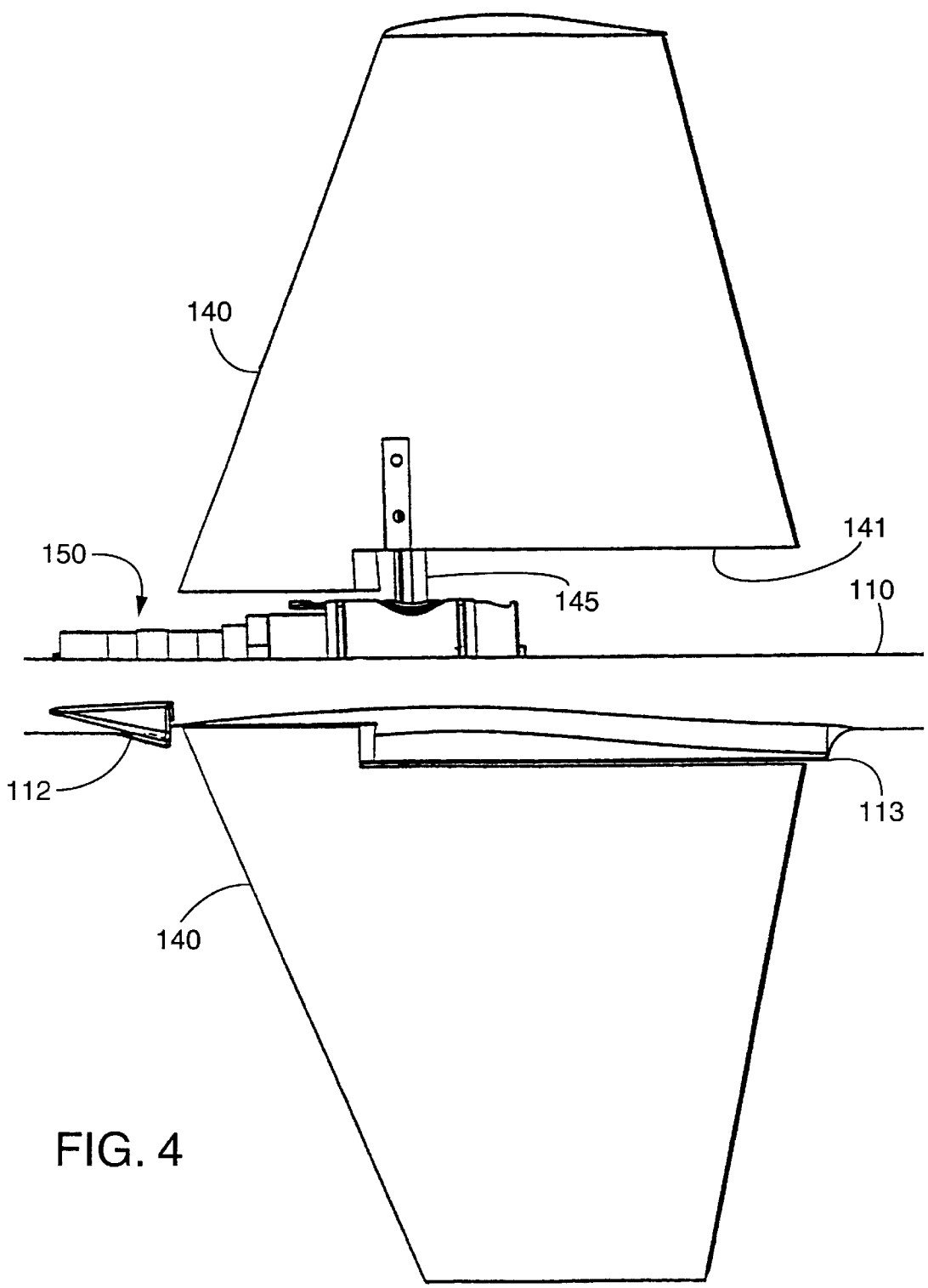
FIG. 4 is a cutaway top view of the midportion of the embodiment of FIG. 1.

FIG. 4 is a cutaway plan view of the region of the depth control device 100 in the vicinity of the wings 140. Each of the wings 140 is rigidly but detachably secured to one of the outer end portions of the drive shaft 145 protruding to the exterior of the body 110 by screws or other suitable means so as to rotate together with the drive shaft 145 about the axis of the drive shaft 145. A fairing 112 may be installed on the body 110 in front of the inboard end of the leading edge of each wing 140 to reduce hydrodynamic noise at the leading edge and to prevent entanglement of the wings 140 with fishing lines, nets, or other objects in the water. An additional fairing 113 is mounted on the body 110 surrounding the actuator assembly 150 adjoining a cutout 141 formed in the inboard portion of each wing 140. The fairing 113 acts to reduce hydrodynamic noise caused by interference effects of the intersection between the body 110 and the wings 140. The fairing 113 also increases the impact resistance of the depth control device. The fairing 113 includes unillustrated bearings which rotatably receive the drive shaft 145. If the wings 140 impact against an object as the depth control device 100 is being towed through the water, the impact can be transmitted to the body 110 through the bearings and the fairing 113 rather than being transmitted to the actuator assembly 150. The wings 140 may have standard foil sections which can be selected based on the desired amount of lift, the primary operating speed, hydrodynamic noise, and other considerations.

Figure 5:
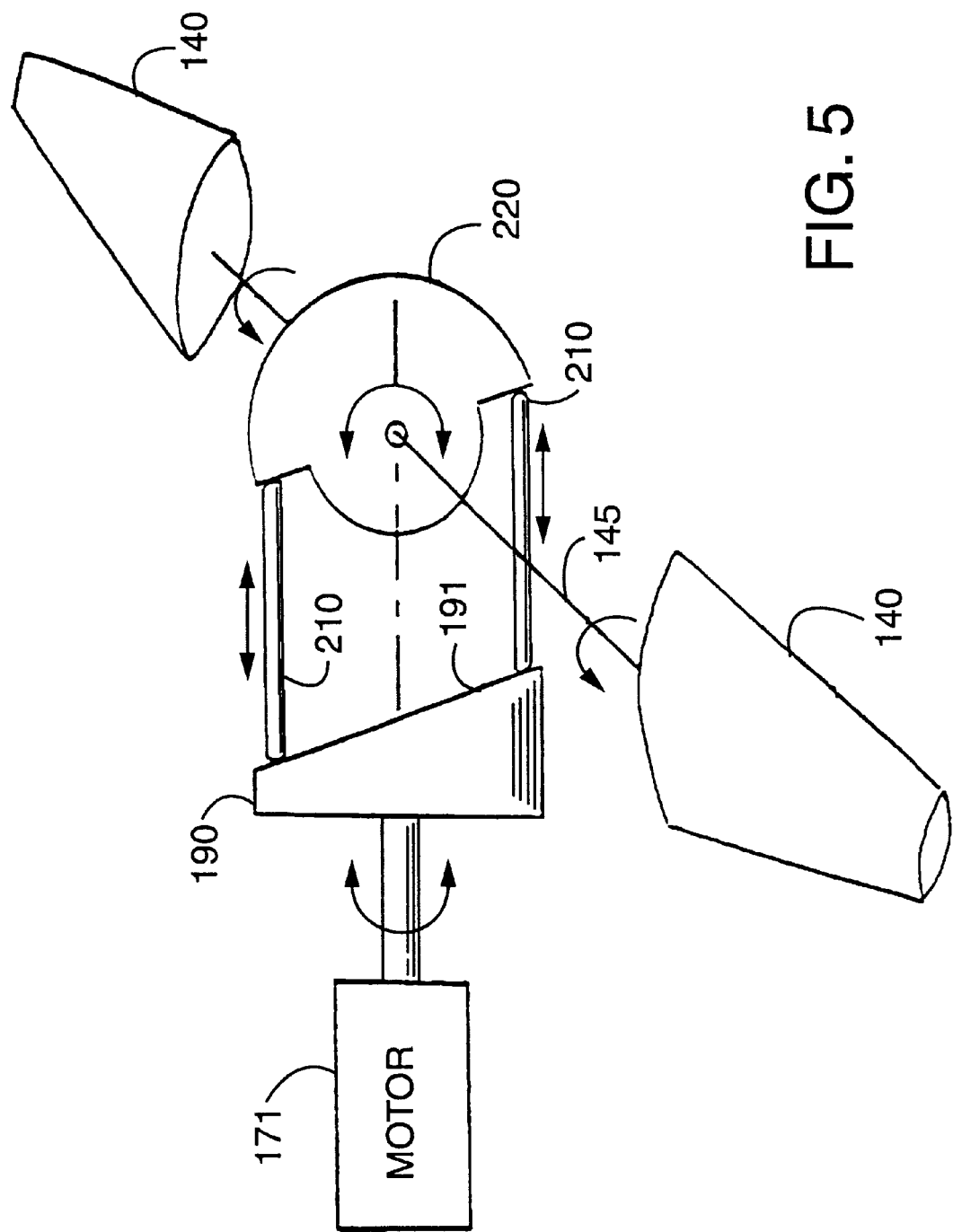
FIG. 5 is a schematic illustration of the embodiment of FIG. 1 showing the operating principles.

FIG. 5 is a schematic illustration showing the principles of operation of the actuator assembly 150. The actuator assembly 150 includes a rotary actuator, such as an electric motor 171, having a rotating output shaft connected to a swash plate 190, which is a cam having a rotational axis and a contact surface 191. Two movable push rods 210 each have a first end in sliding contact with the contact surface 191 of the swash plate 190 and a second end opposing a rocker arm 220 having an axis of rotation intersecting and perpendicular to the axis of the output shaft of the motor 171. The contact surface 191 of the swash plate 190 may have any shape such that the location of a point of intersection between the contact surface 191 and an imaginary line parallel to the rotational axis of the swash plate 190 varies in the direction parallel to the rotational axis as the swash plate 190 rotates. With such a shape, rotation of the swash plate 190 causes the push rods 210 to translate in their axial direction. The swash plate 190, the push rods 210, and the rocker arm 220 together convert the rotation of the output shaft of the electric motor 171 into rotation of the rocker arm 220 about the pitch axes of the wings 140. The drive shaft 145 for the wings 140 is coaxially connected to the rocker arm 220 so as to rotate with the rocker arm 220. The drive shaft 145 actually extends perpendicular to the plane of the figure through the rotational center of the rocker arm 220, but for ease of illustration, the drive shaft 145 is shown extending diagonally with respect to the axis of the rocker arm 220. Since the axis of the drive shaft 145 coincides with the axis of rotation of the rocker arm 220, the pitch axes of the wings 140 (which coincide with the rotational axis of the drive shaft 145) intersect and are perpendicular to and coplanar with the axis of the output shaft of the motor 171. Although the motor 171 and swash plate 190 are illustrated as being on the forward side of the drive shaft 145 with respect to the direction of movement of the depth control device 100 through the water (to the left in the figure), they can be located elsewhere, such as on the rear side. Furthermore, while the centerline of the output shaft of the motor 171 preferably lies in a plane containing the centerline of the cable 100, it need not be parallel to the centerline of the cable 100. For example, the motor 171 may be installed in one of the arms 120, 130 with the centerline of its output shaft extending transversely to the axis of the cable 100, such as vertically. For ease of manufacture, it may be convenient for the push rods 210 to extend parallel to the axis of the output shaft of the motor 171, but they may extend at any other angle which enables them to transmit force from the swash plate 190 to the rocker arm 220 so as to exert a torque on the rocker arm 220 about its rotational axis. The illustrated push rods 210 are substantially straight, but they may instead be curved or crank-shaped, for example.

When the motor 171 is driven to rotate the swash plate 190 about the axis of the output shaft of the motor 171 in either the clockwise or counterclockwise direction, the swash plate 190 exerts an axial force on one of the push rods 210 to urge the one push rod 210 to the right in the figure towards the rocker arm 220. The push rod 210 which is urged to the right exerts a force on the rocker arm 220 to pivot the rocker arm 220 about its axis, thereby rotating the drive shaft 145 about its axis to change the pitch angle of the wings 140. When the upper push rod 210 in FIG. 5 is urged to the right in the figure, the pitch angle of the wings 140 is increased, i.e,. the leading edge of each wing 140 is raised, and when the lower push rod 210 is urged to the right, the pitch angle decreases, i.e., the leading edge of each wing 140 is lowered. As one push rod 210 is being pushed to the right by the swash plate 190, the other push rod 210 is being pushed to the left, i.e., towards the swash plate 190, by the rocker arm 220. The swash plate 190 can be shaped such that the direction in which the push rods 210 are moved depends solely on the direction in which the swash plate 190 is rotated, or it can be shaped such that the direction of movement of the push rods 210 depends both on the direction of rotation of the swash plate 190 and the rotational position of the swash plate 190 at any given moment. An example of the formed type of swash plate is one which must be reversed in rotational direction to reverse the direction of movement of the push rods 210 with respect to the swash plate. An example of the latter type of swash plate is one which can be rotated continuously in one rotational direction, with each push rod 210 moving in one direction with respect to the swash plate during 180° of a rotation of the swash plate and then moving in the opposite direction during the remaining 180° of rotation.

Although the illustrated actuator assembly 150 includes two push rods 210, one for rotating the rocker arm 220 clockwise and the other for rotating the rocker arm 220 counterclockwise, one of the push rods 210 may be omitted, with a single push rod 210 rotating the rocker arm 220 in a first direction and with a return spring rotating the rocker arm 220 in the opposite direction.

Figure 6:
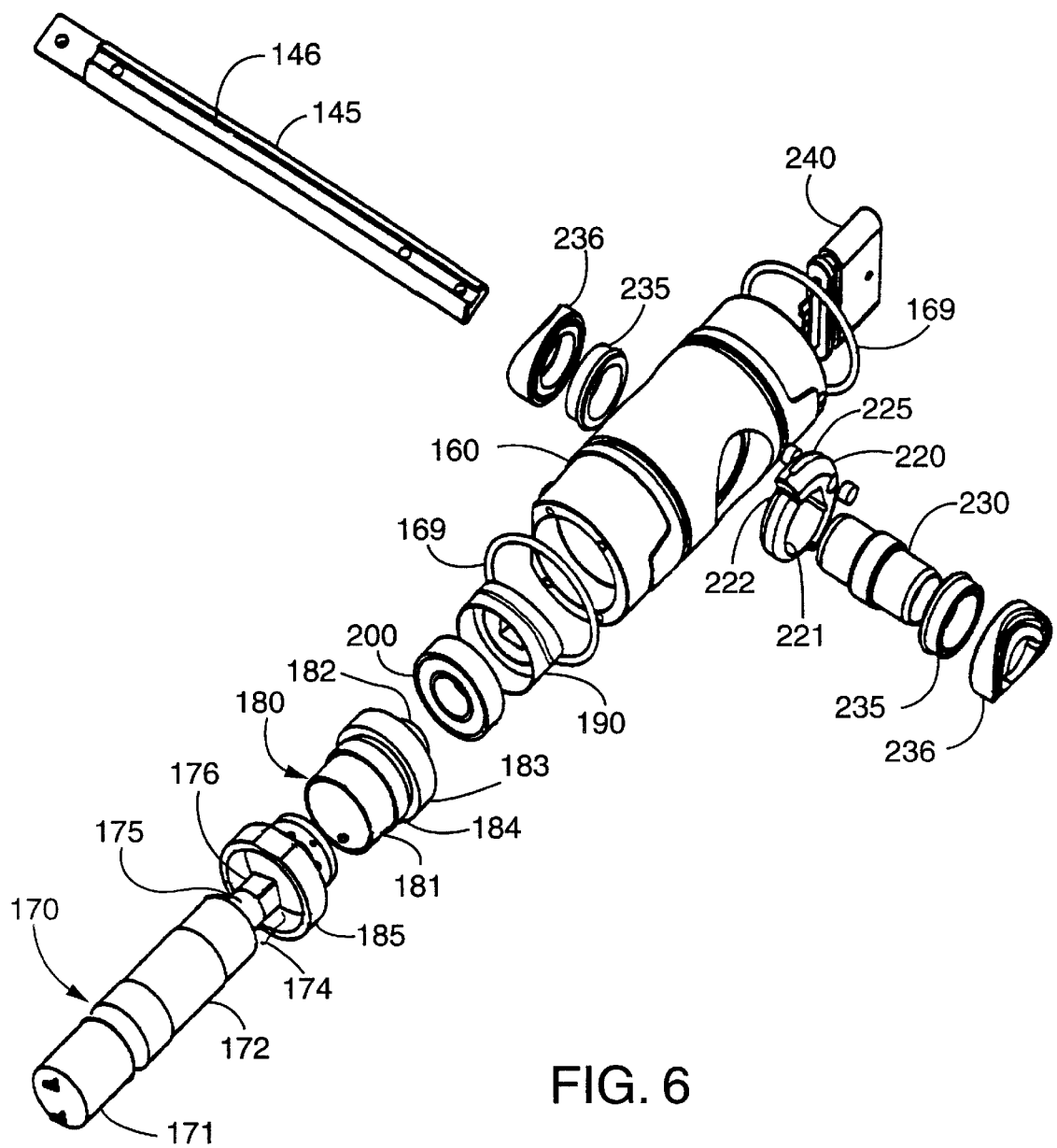
FIG. 6 is an exploded isometric view of the actuator assembly of the embodiment of FIG. 1.

FIG. 6 is an exploded isometric view of an example of the actuator assembly 150. It includes a housing 160 for positioning the various components of the actuator assembly 150 with respect to each other and with respect to the wings 140. The housing 160 has a generally cylindrical outer periphery matching the cylindrical inner periphery of the cylindrical body 110 of the depth control device 100, but it may have any other desired shape which enables it to fit into the body 110. The actuator assembly 150 also includes a motor unit 170 which is inserted into one end of the housing 160, a rotational position sensor 240 inserted into the opposite end of the housing 160, a rocker arm 220 which is inserted into the housing 160 so as to be aligned with a transverse bore 164 extending between opposite sides of the housing 160, and a number of components for rotatably supporting the rocker arm 220 in alignment with the transverse bore 164, for enabling the drive shaft 145 for the wings 140 to be connected to the rocker arm 220, and for sealing the transverse bore 164.

The motor unit 170 includes an electric motor 171, such as a reversible rotating DC motor. If the motor 171 is sufficiently powerful, it may drive the swash plate 190 directly. Alternatively, the motor 171 may be connected to the swash plate 190 through a reduction unit 172 to increase the torque applied to the swash plate 190. In the present embodiment, the motor 171 is connected to an in-line planetary gear reduction unit 172 having an output shaft 173 coaxial with the output shaft of the motor 171. A variety of motors and reduction units suitable for use in the present invention are commercially available. A planetary gear reduction unit 172 is particularly suitable because it can be extremely compact while providing a high reduction ratio and enables the output shaft of the reduction unit 172 to be coaxial with the motor output shaft, but other types of reduction units may also be used. The motor unit 170 may be controlled by any suitable control mechanism. In the present invention, the motor unit 170 is controlled by an electronic control module 250 which is disposed in the body 110 of the depth control device 100 and which may contain a variety of conventional control circuitry, such as a power supply, A/D and/or D/A converters, motor drive circuits, and a microprocessor for performing programmable control. Alternatively, the motor unit 170 and other equipment in the depth control device 100 may be controlled by a control mechanism located outside the depth control device 100, such as in the cable 10 or aboard the towing vessel. Electrical power for the motor unit 170, the control module 250, and other electrical equipment in the depth control device 100 may be generated by a battery within the depth control device 100, and/or it may be generated aboard the vessel which is towing the cable 10 through the water and transmitted to the depth control device 100 via the cable 10. In the latter case, the depth control device 100 may be directly connected to wiring within the cable 10, or coils within the depth control device 100 may be inductively coupled to coils within the cable 10 to enable power and/or data and control signals to be transmitted inductively between the cable 10 and the depth control device 100.

The reduction unit 172 may be drivingly connected to the swash plate 190 in any suitable manner which enables the swash plate 190 to be rotated by the reduction unit 172. In the present embodiment, the output shaft 173 of the reduction unit 172 is connected to an adapter 174 having a cylindrical portion 175 and a rectangular portion 176 farther from the reduction unit 172 than the cylindrical portion 175. The adapter 174 may be connected to the output shaft 173 in any manner which enables them to rotate as a single unit. The cylindrical portion 175 of the adapter 174 fits snugly into the inner race of a rotational bearing, such as a ball bearing 200, while the rectangular portion 176 fits into a rectangular bore 193 formed in the swash plate 190 so that the swash plate 190 will rotate together with the adapter 174. The swash plate 190 has a cylindrical skirt 192 which fits over the outer race of the ball bearing 200. The ball bearing 200, which is optional, serves to reinforce the swash plate 190 against axial forces and enables the swash plate 190 to rotate more smoothly.

The motor unit 170 is supported by a cylindrical connector 180 which is secured to the end surface of the motor unit 170 by screws or other suitable means. The left end of the connector 180 has a cylindrical wall 181 which surrounds the right end of the reduction unit 172, and the right end of the connector 180 has a cylindrical portion 182 which loosely surrounds the adapter 174 connected to the output shaft 173 of the reduction unit 172. The connector 180 is formed with external threads 183 which can be screwed into internal threads formed in the left end of the housing 160 to secure the motor unit 170 to the housing 160. When the motor unit 170 has been screwed into the housing 160, a lock nut 185 can be screwed onto external threads 184 over the connector 180 until the lock nut 185 abuts the axial end face of the housing 160.

The rocker arm 220 can have any shape which enables it to transmit a torque to the drive shaft 145 when acted upon by one of the push rods 210. A single rocker arm can be acted on by both push rods 210 as in the present embodiment, or a separate rocker arm can be provided for each push rod 210. In the present embodiment, the rocker arm 220 is in the shape of a ring having a generally circular bore 221 into which the drive shaft 145 can be inserted. Two contact surfaces 222 against which the push rods 210 can exert a compressive force to pivot the rocker arm 220 are formed on the rocker arm 220 on opposite sides of the bore 221. Three pairs of magnets 224a–224c for sensing by the rotational position sensor 240 are inserted into corresponding aligned bores 223 formed in the sides of the rocker arm 220. A slot 225 for receiving a portion of the rotational position sensor 240 is formed in the rocker arm 220 around a portion of its periphery and passes between the two magnets of each pair.

The drive shaft 145 for the wings 140 may be connected directly to the rocker arm 220, but in the present embodiment, it is slidably received in a generally cylindrical insert 230 which fits into the bore 221 of the rocker arm 220. The outer surface of the insert 230 and the inner surface of the bore 221 of the rocker arm 220 have complementary shapes to prevent their relative rotation. For example, in the present embodiment, the insert 230 and the bore 221 have flats on their opposing surfaces which abut against each other to resist rotation of the insert 230 with respect to the bore 221. The insert 230 is also shaped so as to prevent the drive shaft 145 from rotating with respect to it while preferably enabling the drive shaft 145 to move with respect to the insert 230 in its axial direction. For example, the insert 230 and the drive shaft 145 may be complementary in shape. In the present embodiment, the insert 230 is formed on its inner surface with keys 231 which engage with keyways 146 formed in the outer surface of the drive shaft 145. The fit between the keys 231 and the keyways 146 is preferably such as to minimize backlash between the drive shaft 145 and the rocker arm 220. The insert 230 may be rotatably supported by suitable journal bearings 236 inserted into opposite ends of the transverse bore 164 of the housing 160. Rotary seals 235 which seal against the outer surface of the insert 230 may be positioned around both ends of the insert 230 to prevent sea water from flowing along the outer surface of the insert 230. Unillustrated face seals may also be installed over the end faces of the bearings 236 at the outer ends of the transverse bore 164.

Figure 7:
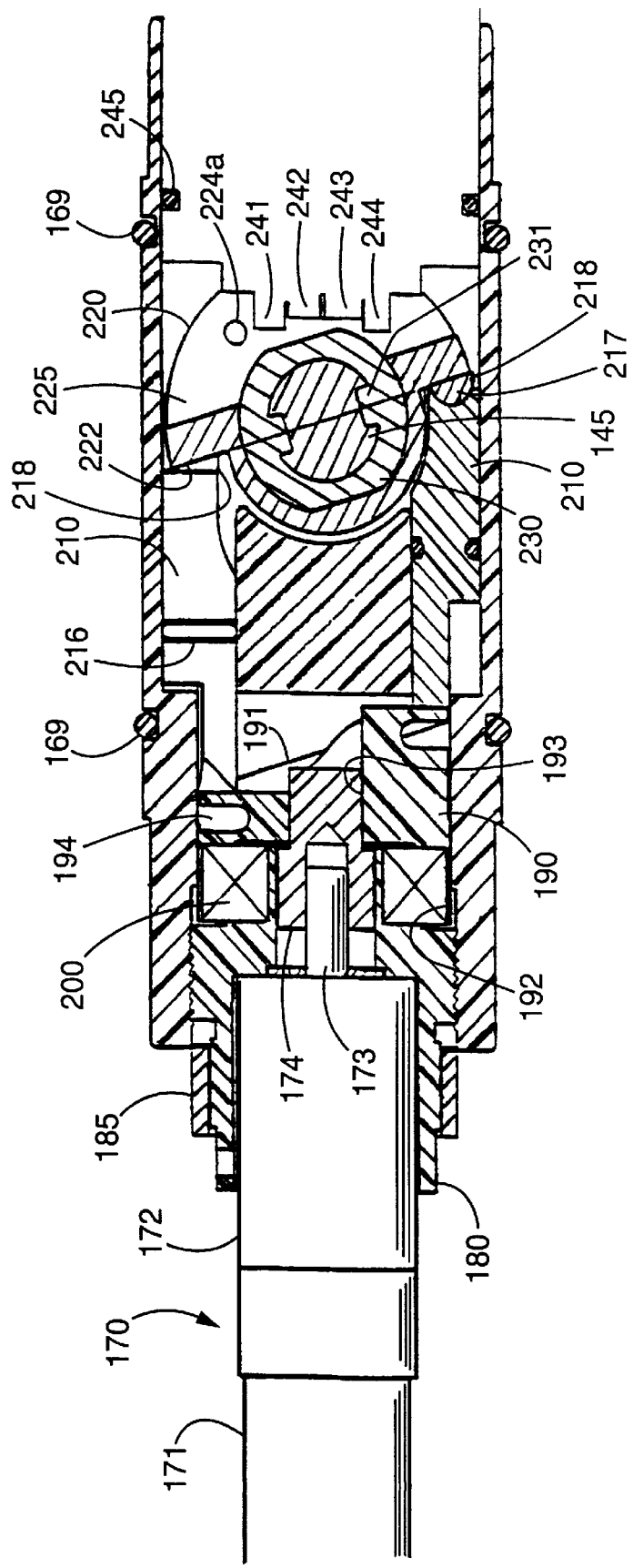
FIG. 7 is a longitudinal cross section of the actuator assembly of FIG. 6.

FIG. 7 illustrates the actuator assembly 150 in an assembled state. The push rods 210 (one of which is shown in profile and the other of which is shown in cross section) are slidably received in corresponding bores in the housing 160. The motor unit 170 is inserted into the housing 160 such that the swash plate 190 opposes the left end of each push rod 210, and the rocker arm 220 is inserted into the housing 160 such that the contact surfaces 222 of the rocker arm 220 oppose the right end of each push rod 210. The rotational position sensor 240 is inserted into the housing 160 until its left side is inserted into the circumferential slot 225 in the rocker arm 220 so as to lie between the two magnets of each pair 224a–224c mounted on the rocker arm 220. A sealing ring 245 may be provided around the rotational position sensor to form a watertight seal between the interior of the housing 160 and the outer surface of the rotational position sensor 240 and prevent water from leaking into the right end of the housing 160.

Figure 11:
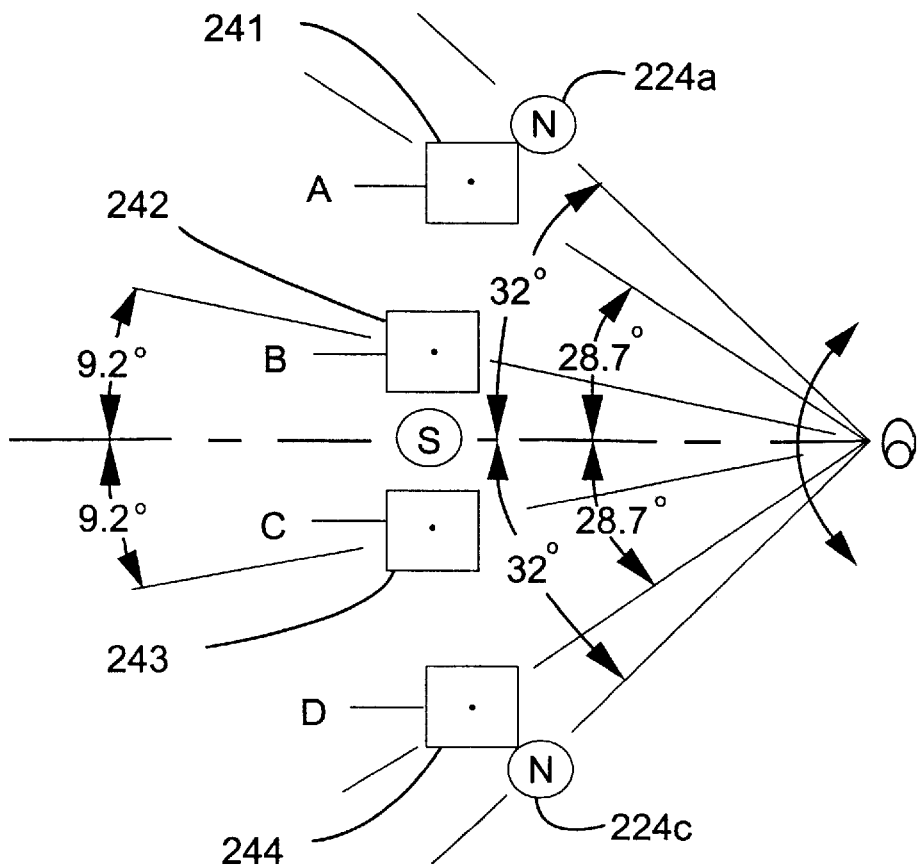
FIG. 11 is a schematic illustration of the relative locations of the Hall effect sensors and the magnets when the wings are at a zero pitch angle.
Figure 12:
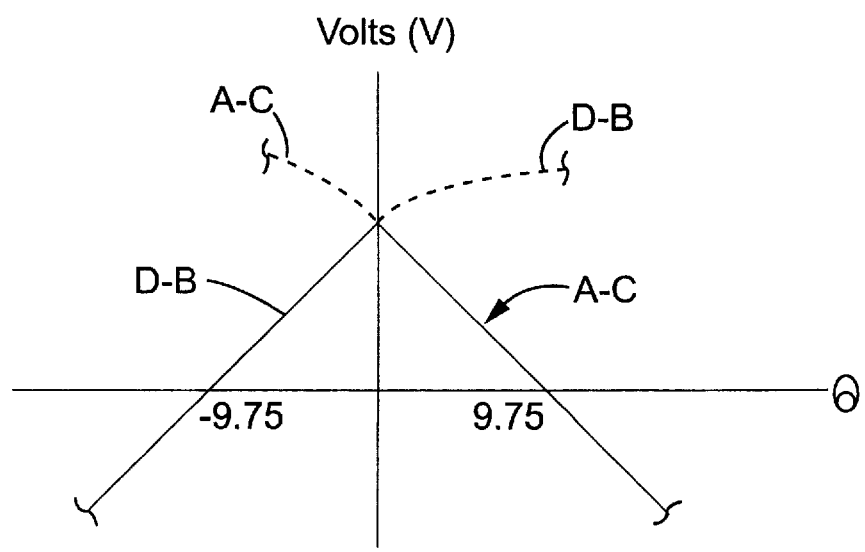
FIG. 12 is a graph showing a method of combining the output voltages from the Hall effect sensors to obtain a function indicative of the pitch angle $\Theta$.

While not essential in controlling the depth control device 100, it is useful to know the pitch angle of the wings 140. For example, when ballasting the cable 10 to give it a desired buoyancy, it is conventional to set the pitch angle to a predetermined value and observe how the depth of the cable 10 varies as it is towed through the water. The pitch angle can be determined in various manners using a wide variety of conventional equipment. For example, the number of rotations of the motor 171 from a reference position corresponding to a predetermined pitch angle of the wings 140 can be counted by an encoder and be used to calculate the present rotational position of drive shaft 145, or if the motor 171 is a stepper motor, the number of pulses supplied to the motor 171 from a starting point corresponding to a known rotational position of the drive shaft 145 can be counted. Alternatively, the position of the swash plate 190, of one of the push rods 210, of the rocker arm 220, of the drive shaft 145, or of the wings 140 themselves can be sensed directly using a wide variety of conventional angle sensors operating on mechanical, electrical, optical, or magnetic principles, for example, to determine the pitch angle. In the present embodiment, the pitch angle is determined by sensing the rotational position of the rocker arm 220 with respect to a reference position. The illustrated rotational position sensor 240 operates on the Hall effect and includes four Hall effect sensors 241–244 encapsulated in a plastic casing and extending into the circumferential slot 225 in the rocker arm 220. The magnets 224a–224c are arranged with the north pole of one magnet in the pair facing the south pole of the other magnet in the same pair. The central pair of magnets 224b is arranged with its poles pointing in the opposite direction from the poles of the other two pairs of magnets 224a and 224c so that the field produced by the central pair 224b is opposite in direction from the fields produced by the other two pairs 224a and 224c. As a result, the central pair of magnets 224b produces a voltage in the Hall effect sensors 241–244 which is opposite in polarity to the voltage produced by the other two pairs 224a and 224c. As the rocker arm 220 rotates, the output voltage of each Hall effect sensor will vary in accordance with the proximity of the Hall effect sensor to the magnets 224a–224c. The rotational angle of the rocker arm 220 can therefore be determined based on the output voltages from one or more of the Hall effect sensors. The output voltages can be used individually as an indication of the rotational angle of the rocker arm 220, or the voltages of a plurality of the Hall effect sensors can be combined in various manners to give a mathematical function indicative of the rotational angle. FIG. 11 schematically illustrates one possible geometry of the Hall effect sensors 241–244 and the magnet pairs 224a–224c. The Hall effect sensors 241–244 are disposed at angles $\Theta$ of +28.7°, +9.2°, −9.2°, and −28.7°, respectively, with respect to a reference line. The three pairs of magnets 224a–224c are located at angles of +32°, 0°, and −32°, respectively, with respect to the reference line when the pitch angle of the wings is 0°. A suitable controller, such as a microprocessor which may be on the control module 250, receives the output signals from the Hall effect sensors 241–244 and calculates the values A-C and D-B, where A through D are respectively the output voltages of Hall effect sensors 241–244. FIG. 12 illustrates an example of the values of A-C and D-B over a limited range of $\Theta$. In the range $\Theta$=0 to +20°, the difference A-C is a fairly linear function of $\Theta$ given approximately by the equation $V = -a\Theta + b$, while in the range $\Theta$=0 to −20°, the difference D-B is a fairly linear function of $\Theta$ given approximately by the equation $V = a\Theta + b$, wherein V indicates voltage, a or −a is the slope of the curve in the linear region, and b is the value of V when $\Theta$=0. For the illustrated arrangement of Hall effect sensors 241–244, the difference D-B is zero at $\Theta$=approximately −9.75°, and the difference A-C is zero at $\Theta$=approximately 9.75°. The controller selects whichever of (A-C) and (D-B) is smaller and determines the corresponding value of $\Theta$ by calculation using the above formulas relating V and $\Theta$, from a look-up table, or by other suitable methods. The present invention is by no means limited to this particular combination of magnets and Hall effect sensors or to the manner of combining the signals from the sensors. For example, it is possible to employ a larger or smaller number of magnets or Hall effect sensors, and the magnets need not be installed in pairs, i.e., it is not necessary for the Hall effect sensors to pass between pairs of magnets, as long as the Hall effect sensors are able to sense the position of the magnets. The number and location of magnets and Hall effect sensors can be selected based on various factors, such as the desired accuracy of position sensing, the range over which the pitch angle needs to be detected, the maximum number of Hall effect sensors that can be used (which may be limited by factors such as electrical power restrictions, cost, the size of the sensors, the ability to process the signals from the sensors), the strength and magnetic field pattern of the magnets, and the sensitivity and dynamic range of the Hall effect sensors. Thus, the geometry of the magnets and Hall effect sensors is in no way limited to that shown in FIG. 11. When the rotational position sensor 240 operates on the Hall effect, the rocker arm 220 may be made of a nonferrous material so as not to interfere with the sensing of the magnets 224a–224c by the Hall effect sensors, or the rocker arm 220 may include portions made of a ferrous or partially ferrous material which can concentrate or focus the magnetic fields produces by the magnets to enhance sensing by the Hall effect sensors. A rotational position sensor of this type is advantageous because it is simple in structure, economical, sturdy, and easy to calibrate and use because it can generate a substantially linear output function that is repeatable. When a rotational position sensor for determining pitch angle employs an encoder which counts the number of rotations of a motor from a reference position, if the count is lost due, for example, to a momentary lapse in electrical power to the encoder or electrical noise, it is necessary to return the motor to its reference position and begin counting the rotations again. In contrast, a rotational position sensor such as that employed in the present embodiment can sense the absolute rotational angle of the rocker arm 220 at any time and is unaffected by fluctuations in electrical power.

Since the Hall effect sensors 241–244 are usually connected by wires to a controller, the structure of the depth control device 100 will typically be simpler if the Hall effect sensors are stationary and the magnets 224a–224c are mounted on the rocker arm 220 or otherwise movable in synchrony with the rotation of the wings 140, but it is also possible for the magnets to be stationary and for the Hall effect sensors 241–244 to be movable in synchrony with the rotation of the wings 140.

Figure 9:
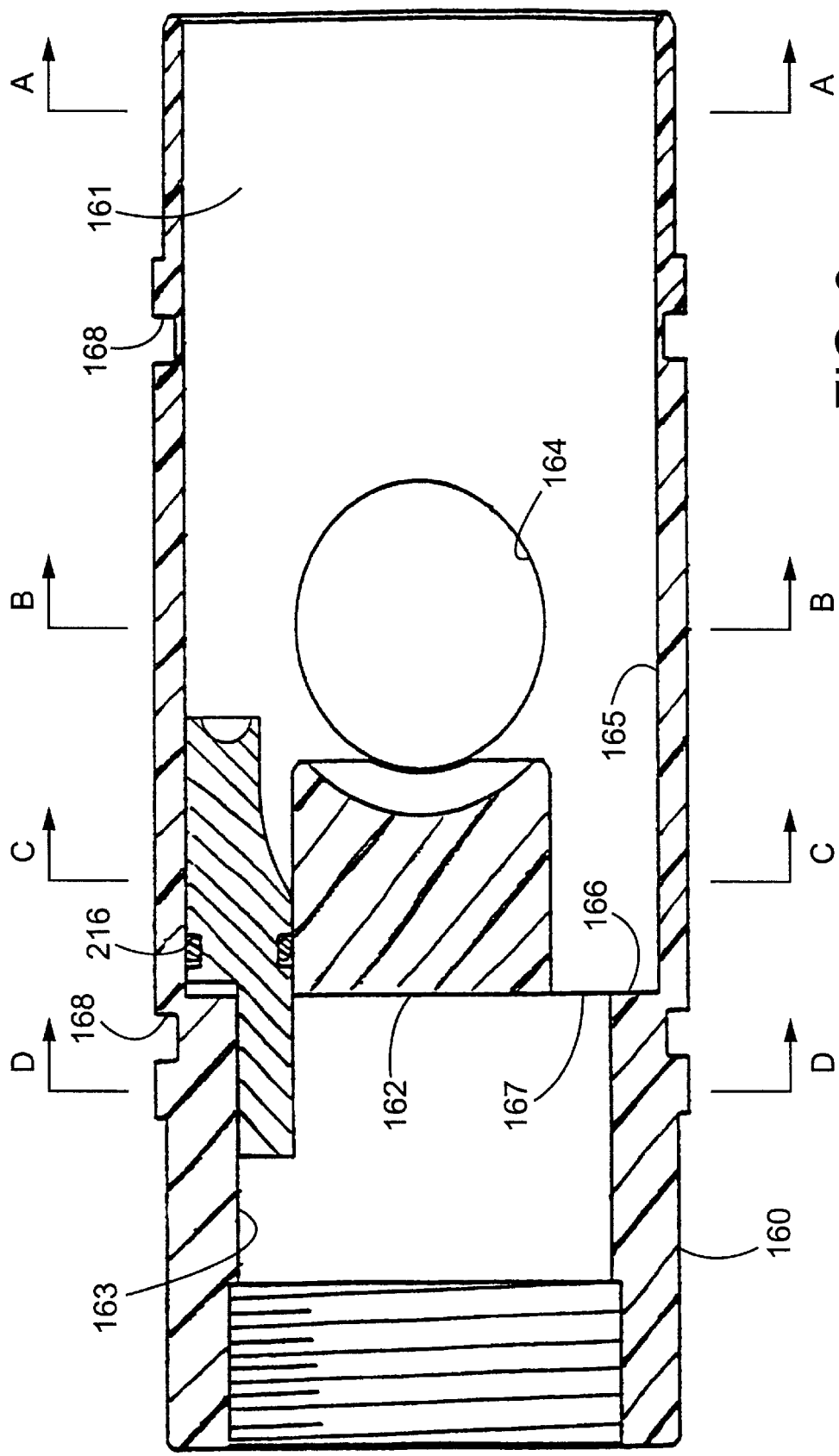
FIG. 9 is a longitudinal cross section of the housing of the actuator assembly of FIG. 6.
Figure 10A:
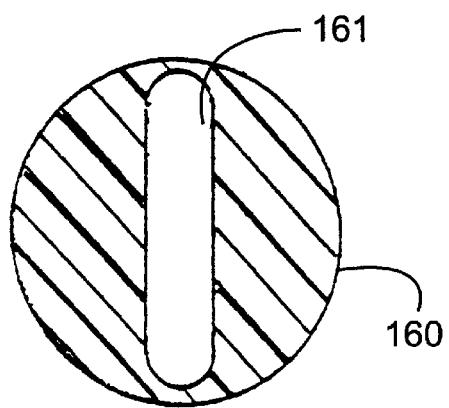
FIGS. 10A–10D are transverse cross sections taken along lines 10A—10A, 10B—10B, 10C—10C, and 10D—10D, respectively, of FIG. 9.
Figure 10B:
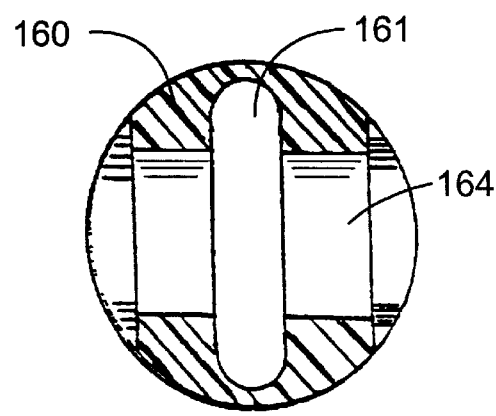
Figure 10C:
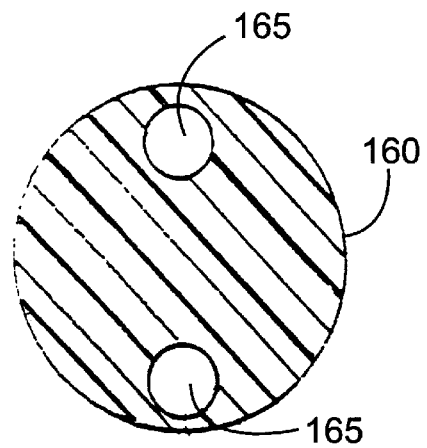
Figure 10D:
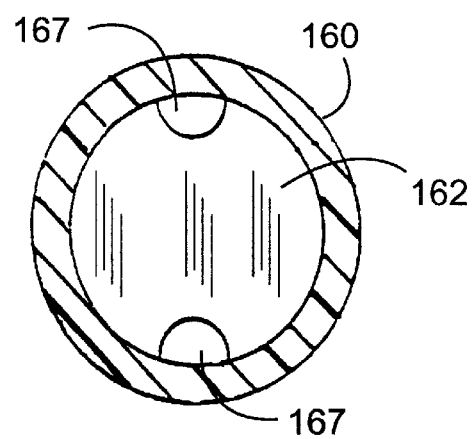

FIG. 9 is a longitudinal cross section of the housing 160 of the actuator assembly 150, and FIGS. 10A through 10D are transverse cross sections at various locations along the housing 160. At its right end in FIG. 9, the housing 160 has a narrow slot 161 which extends between an end surface of the housing 160 and a wall 162. Just to the right of the wall 162, the transverse bore 164 intersects the slot 161 and extends radially to the outer peripheral surface of the housing 160. At its left end, the housing 160 is formed with a cylindrical bore 163 which extends between an end surface of the housing 160 and the left side of the wall 162. The bore 163 may be formed with internal threads for engagement with the external threads 183 on the connector 180. The slot 161 and the bore 163 are connected with each other by two diametrically opposed cylindrical bores 165, each of which slidably receives one of the push rods 210. The left end of each bore 165 abuts against a step 166 and communicates with cylindrical bore 163 through a semicircular opening 167. On its outer periphery, the housing 160 is formed with circumferential grooves 168 which receive O-rings 169 for forming a watertight seal between the outer periphery of the housing 160 and the inner periphery of the tubular body 110 of the depth control device 100.

The housing 160 may be made of a wide variety of materials. Preferably, the material is resistant to sea water and easy to shape. One example of a suitable material is Delrin (trademark of DuPont for an acetal resin) impregnated with Teflon.

In order to assemble the depth control device 100, the push rods 210 are inserted into the housing 160 through the slot 161 at the right end of the housing 160 in FIG. 9 and disposed in the cylindrical bores 165 with the left end of each push rod 210 extending into the cylindrical bore 163 at the left end of the housing 160. The rocker arm 220 with the magnets 224 mounted on it is then inserted into the housing 160 through the slot 161 and positioned so that its bore 221 is aligned with the transverse bore 164 in the housing 160. The insert 230 is then inserted through the transverse bore 164 until it engages with the bore 221 in the rocker arm 220, and the seals 235 and bearings 236 are then inserted into the transverse bore 164 to engage with the ends of the insert 230. The rotational position sensor 240 is next inserted into the slot 161 until the Hall effect sensors 241–244 have entered the circumferential slot 225 in the rocker arm 220. The motor unit 170 is then screwed into the left end of the housing 160 by engagement between the external threads 183 on the connector 180 and the internal threads of the cylindrical bore 163 until the swash plate 190 is contacting or in close proximity to the left ends of the push rods 210. After the O-rings 169 are mounted on the exterior of the housing 160, the actuator assembly 150 can be inserted into the body 110 of the depth control device 100. Although not shown in the drawings, the actuator assembly 150 may be equipped with cylindrical covers which fit over the lengthwise ends of the housing 160 to protect the motor unit 170 and the rotational position sensor 240.

Figure 8:
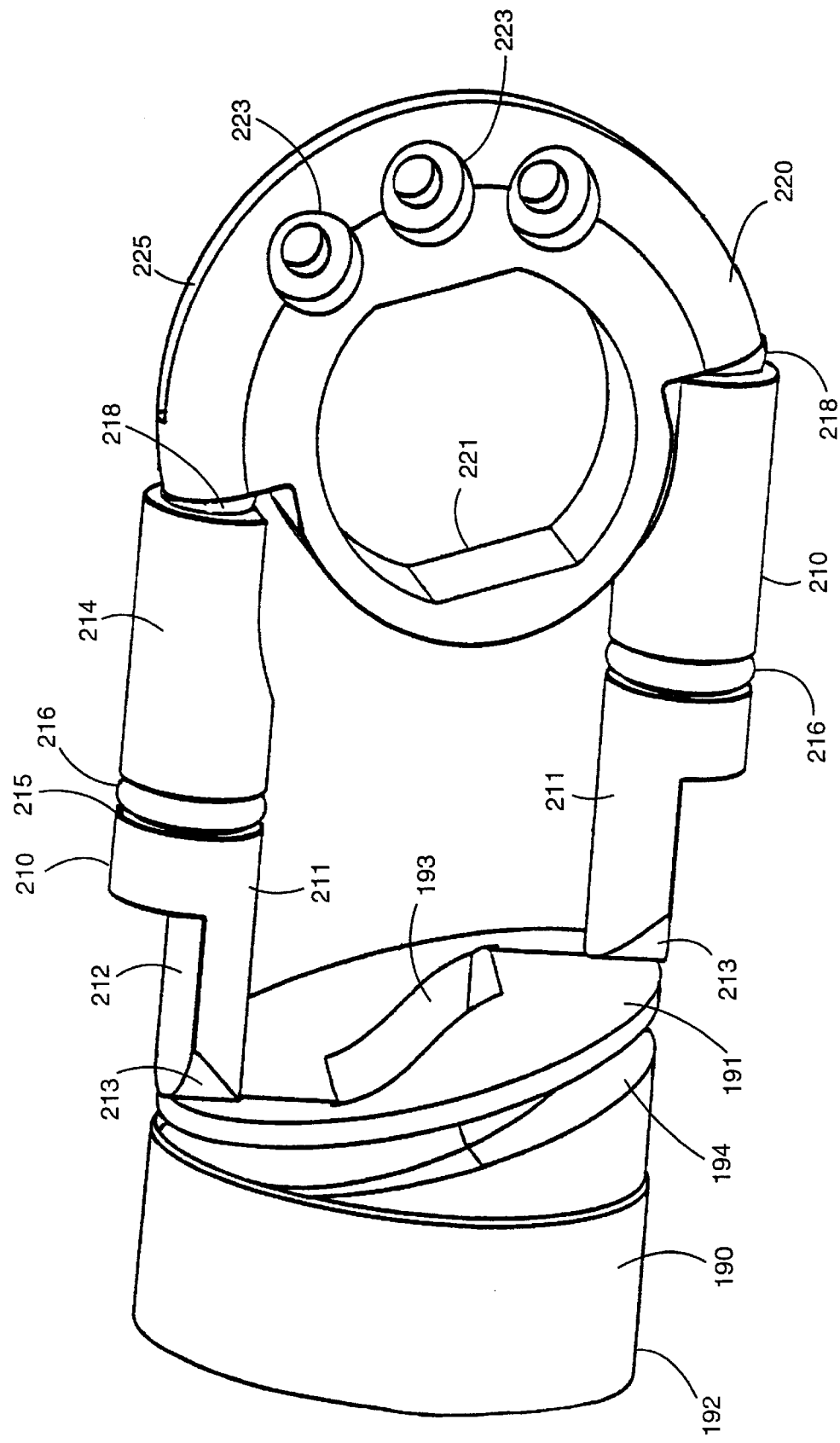
FIG. 8 is an isometric view of the swash plate, the push rods, and the rocker arm of the actuator assembly of FIG. 6 in a partially assembled state.

The contact surface 191 of the swash plate 190 can have any shape which enables it to exert a force on one of the push rods 210 to cause the push rod 210 to move toward the rocker arm 220, e.g., to the right in FIG. 8, when the swash plate 190 is rotated in a first direction and to exert a force on the other push rod 210 to cause it to move toward the rocker arm 220 when the swash plate 190 is rotated in the opposite direction. For example, the swash plate 190 may have a shape such as any of those used for swash plates in conventional swash plate pumps or motors. In its simplest form, the contact surface 191 may be defined by a single plane. In the present embodiment, the contact surface 191 of the swash plate 190 is shaped so as to maximize the contact area between the swash plate 190 and the push rods 210 at any rotational position of the swash plate 190, thereby minimizing compressive stresses. The illustrated contact surface 191 has generally the shape of the flank of a square thread screw, meaning that at any longitudinal cross section of the swash plate 190 in a plane containing the rotational axis of the swash plate 190, the top surface of the cross section on the contact surface 191 is perpendicular to the rotational axis of the swash plate 190.

In this embodiment, the height of the contact surface 191 of the swash plate 190 measured in the axial direction of the swash plate 190 continually changes around the circumference of the swash plate 190 so that rotation of the swash plate 190 from any angular position will produce movement of the push rods 210. However, the swash plate 190 may be formed with flat regions of constant height so that when the push rods 210 are contacting these regions, rotation of the swash plate 190 will produce no translation of the push rods 210. In FIG. 8, the push rods 210 are shown contacting the contact surface 191 at the highest and lowest regions on the contact surface 191. In this embodiment, the contact surface 191 is symmetric with respect to a plane passing through the highest and lowest points and the rotational axis of the swash plate 190.

Since the swash plate 190 is in sliding contact with the push rods 210 and may sometimes be impacted by the push rods 210, the swash plate 190 is preferably made of a material having good wear resistance, good impact resistance, a surface hard enough not to be damaged by the pressure of the push rods 210, and a low coefficient of friction. An example of a material which is particularly suitable for the swash plate 190 is a bearing grade plastic or alloy.

To prevent impacts of the push rods 210 against the swash plate 190 from applying excessive compressive forces on the motor unit 170 and to prevent the swash plate 190 from being overloaded in compression during assembly, a member, such as a spring, capable of elastically deforming in compression may be disposed between the swash plate 190 and the motor unit 170. Alternatively, the swash plate 190 itself may be shaped so as to elastically yield in compression by a sufficient amount to prevent overloading of the motor unit 170. In the present embodiment, a groove 194 is formed in the outer periphery of the swash plate 190 around its entire circumference a distance from the contact surface 191 of the swash plate 190 so that the contact surface 191 is essentially cantilever supported and can elastically flex to permit axial movement of the contact surface 191 in response to a compressive load. If desired, an elastically compressible material can be disposed in the groove 194 to adjust the stiffness of the swash plate 190 in compression.

The push rods 210 may have any shape which enables them to slide back and forth axially in the housing 160 while transmitting a compressive force between the swash plate 190 and the rocker arm 220. FIG. 8 shows the push rods 210 of the present embodiment in detail. The radially inner surface 211 (the surface facing an imaginary line containing the rotational axis of the swash plate 190) of the left end of each push rod 210 has a semicircular cross section slightly smaller in radius than the semicircular hole 167 in the wall 162 of the housing 160, while the radially outer surface 212 is an arc of a circle for contacting the inner periphery of the bore 163 at the left end of the housing 160 in FIG. 9. Each push rod 210 fits sufficiently loosely in the corresponding hole 167 in the wall 162 to permit the push rod 210 to easily reciprocate, but the fit is sufficiently tight to prevent the push rod 210 from rotating about its axis. The end surface 213 of each push rod 210 which contacts the swash plate 190 is preferably shaped to produce substantially line contact with the swash plate 190 at any rotational position of the swash plate 190. For example, when viewed in cross section as shown in FIG. 7, the end surface 213 may extend substantially perpendicular to the rotational axis of the swash plate 190 and parallel to the contact surface 191 of the swash plate 190. The right portion of each push rod 210 in FIG. 8 has an outer peripheral surface 214 which is a segment of a cylinder for sliding contact with the cylindrical bore 165 in the wall 162. Between its two ends, each push rod 210 is formed with a circumferentially extending groove 215 for receiving a sealing member, such as an O-ring 216, which forms a sliding seal against the inner periphery of the bore 165 through the wall 162 and prevents water from leaking along the bore 165.

The right end of each push rod 210 may directly contact the rocker arm 220, but in the present embodiment, a bearing 218 capable of transmitting an axial compressive force is disposed between each push rod 210 and the rocker arm 220. One side of each bearing 218 is shaped so as to remain in surface contact with the rocker arm 220 while the other side is shaped to remain in surface contact with the push rod 210 regardless of the rotational angle of the rocker arm 220. For example, the right side of each bearing 218 may have a flat surface which abuts flat against a flat surface of the rocker arm 220, while the left side of each bearing 218 may be a portion of a sphere which is slidably received in a recess 217 formed in the right end of each push rod 210 and having a shape which is also a portion of a sphere. With this arrangement, the area of contact between the bearings 218 and the rocker arm 220 and the area of contact between the bearings 218 and the push rods 210 remains substantially the same at any rotational angle of the rocker arm 220.

Instead of being in sliding contact with the swash plate 190, the push rods 210 may be equipped with rollers which are in rolling contact with the contact surface 191 of the swash plate 190. A similar arrangement may be provided between the push rods 210 and the rocker arm 220. Furthermore, instead of simply opposing the rocker arm 220, the push rods 210 may be pivotably connected to it. Thus, the push rods 210 may be arranged in any manner which enables them to exert a torque on the rocker arm 220 about its axis when the swash plate 190 is rotated.

When the cable 10 is being towed through the water, the wings 140 may occasionally strike debris floating in the water, and the impact may exert a considerable torque on the drive shaft 145 about its axis. The torque will cause the rotation of the rocker arm 220 to force one of the push rods 210 against the contact surface 191 of the swash plate 190. Since there is substantially line contact between each push rod 210 and the contact surface 191 of the swash plate 190 along a line perpendicular to the axis of rotation of the swash plate 190, stresses caused by impacts are distributed over the largest area possible, thereby reducing yielding of the swash plate 190 or the push rods 210. The slope of the surface of the swash plate 190 contacted by the push rods 210 and the coefficients of friction of the swash plate 190 and the push rods 210 are preferably selected such that a compressive force applied to the swash plate 190 by either push rod 210 will produce little tendency for the swash plate 190 to rotate about its axis, i.e., such that the push rods 210 will not backdrive the swash plate 190, so that very little torque will be applied to the output shaft 173 of the reduction unit 172 and the gears of the reduction unit 172 will be protected against damage.

The depth control device 100 may operate in a manner similar to a conventional depth control device. The depth of the cable 10 in the vicinity of the depth control device 100 is measured by the unillustrated depth sensor and is compared by the control module 250 with a target value. The target value may be calculated by the control module 250 based on various sensed parameters, it may be stored in a memory of the control module 250 in advance, or it may be determined by an external controller aboard the towing vessel, for example, and transmitted to the control module 250 as part of a data signal via the cable 10. If it is determined by the comparison that the cable 10 is too deep in the water, the motor unit 170 is controlled by the control module 250 to rotate the swash plate 190 to produce a more positive pitch angle of the wings 140, such as one which generates an upward force on the cable 10. Conversely, if it is determined from the comparison that the cable 10 is too shallow in the water, the motor unit 170 is controlled to rotate the swash plate 190 to produce a more negative pitch angle of the wings 140, such as one which generates a downward force on the cable 10. When the target depth is reached, the motor unit 170 is controlled to set the pitch angle of the wings 140 to a value which will maintain the depth of the depth control device 100 constant. The control module 250 may employ any desired control algorithm, such as various types of conventional algorithms for closed-loop control, depending upon the desired response characteristics of the control module 250. For example, in the present embodiment, when the depth control device is operating in an automatic depth maintaining mode in which it automatically adjusts the pitch angle to maintain the target depth, a microprocessor in the control module 250 calculates a target pitch angle based on the difference between the target depth and the actual depth measured by the depth sensor, the time differential of the difference, and the time integral of the difference. The microprocessor also calculates the actual pitch angle of the wings 140 based on the output signals from the rotational position sensor 240, and it compares the target pitch angle with the actual pitch angle. The microprocessor then controls the motor unit 170, through a suitable drive circuit which may be part of the control unit 250, to rotate the swash plate 190 so as to decrease the difference between the target and actual pitch angles to a predetermined range. In a manual mode of operation, the target pitch angle is input to the control unit 250 from the towing vessel via the cable 10 rather than being determined by the microprocessor in the control unit 250, but in this mode of operation as well, the microprocessor controls the motor unit 170 to rotate the swash plate 190 so as to decrease the difference between the target and actual pitch angles to a predetermined range.

A depth control device according to the present invention provides a number of significant advantages. Because the axis of the output shaft of the motor 171 can intersect the pitch axis of the wings 140 rather than having to be offset from it, the body 110 of the depth control device 100 can have a simple shape of small diameter and the wings 140 can be mounted directly on the body 110, resulting in a reduction in drag, vibrations, and hydrodynamic noise of the depth control device. In addition, the swash plate 190 and rocker arm 220 used to convert the rotation of the motor 171 into the rotation of the wings 140 provide a simple, sturdy, and highly reliable arrangement which can protect the motor 171 and the reduction unit 172 against damage when torque is applied to the wings 140 by impacts against objects in the water. Furthermore, because the actuator assembly 150 is a module which can be readily detached from the body 110 of the depth control device 100 and from the wings 140, it is possible to easily replace it when it needs repair or when it is desired to employ a different actuator assembly having different operating characteristics. Thus, the cost of assembly and repair is decreased, and the depth control device 100 can be readily adapted to different operating conditions by replacing the wings 140 or the actuator assembly 150 with ones most suitable to the operating conditions.

A structure including a swash plate, a rocker arm, and push rods is not limited to use in adjusting the pitch angle of wings for adjusting the depth of a cable but can also be used for adjusting the pitch angle of other control surfaces, such as fins or wings for controlling the horizontal heading of a cable. Furthermore, it is possible for a swash plate and rocker arm arrangement to pivot a single wing rather than a pair of wings. For example, if a depth control device has two wings 140 having pitch axes which are not aligned with each other (such as if the wings 140 are dihedral), each wing 140 may have a separate drive shaft which is rotated by a separate rocker arm, with the rocker arms being operated by separate swash plates.

Although the pitch axis of the wings 140 preferably passes through the rotational center of the rocker arm 220 in order to minimize the size of the depth control device 100, it is also possible for the pitch axis to be offset from the rotational center. For example, the drive shaft 145 for the wings 140 could be spaced from the rotational center of the rocker arm 220 and be connected to the rocker arm 220 by belts, gears, or links.

What is claimed is:

1. A depth control device for an underwater cable comprising:
    a rotary actuator having a rotating output shaft;
    a swash plate rotatable by the output shaft and having a contact surface;
    a rocker arm having a rotational axis;
    a first push rod having a first end engageable with the contact surface of the swash plate and a second end engageable with the rocker arm; and
    a first wing having a pitch axis and being operatively associated with the rocker arm such that rotation of the rocker arm about its rotational axis rotates the first wing about its pitch axis.

2. A depth control device as claimed in claim 1 including a second wing having a pitch axis and being operatively associated with the rocker arm such that rotation of the rocker arm about its rotational axis rotates the second wing about its pitch axis.

3. A depth control device as claimed in claim 2 wherein the pitch axes of the first and second wings are coaxial.

4. A depth control device as claimed in claim 2 including a drive shaft extending between the first and second wings and rotated by the rocker arm.

5. A depth control device as claimed in claim 2 wherein the pitch axes are perpendicular to and intersect a rotational axis of the output shaft of the actuator.

6. A depth control device as claimed in claim 5 wherein the pitch axes are coplanar with the rotational axis of the output shaft of the actuator.

7. A depth control device as claimed in claim 1 wherein the first push rod is in substantially line contact with the contact surface of the swash plate at any rotational position of the swash plate.

8. A depth control device as claimed in claim 7 wherein the contact surface of the swash plate has a shape of a flank of a square thread.

9. A depth control device as claimed in claim 1 including a magnet mounted on the rocker arm and a rotational position sensor sensing a rotational position of the rocker arm, the rotational position sensor including a Hall effect sensor responsive to the magnet on the rocker arm.

10. A depth control device as claimed in claim 9 including two magnets mounted on the rocker arm, the rocker arm including an elongated slot passing between the magnets, the Hall effect sensor extending into the slot so as to pass between the magnets when the rocker arm rotates.

11. A depth control device as claimed in claim 1 including a second push rod having a first end engageable with the contact surface of the swash plate and a second end engageable with the rocker arm.

12. A depth control device for an underwater cable comprising:
    first and second wings;
    a drive shaft extending along a straight line between the first and second wings and having a rotational axis; and
    an actuator having a rotating output shaft operatively associated with the drive shaft for rotating the drive shaft about its rotational axis, the output shaft having a rotational axis intersecting the rotational axis of the drive shaft.

13. A depth control device as claimed in claim 12 wherein the rotational axis of the output shaft is perpendicular to the rotational axis of the drive shaft.

14. A depth control device for an underwater cable comprising:

a hollow body for attachment to an underwater cable;

a drive shaft having a rotational axis and extending to an exterior of the body through openings in the body;

first and second wings disposed outside the body on opposite sides thereof and mounted on the drive shaft for rotation therewith; and an actuator assembly disposed in the body and engaging the drive shaft to rotate the drive shaft about the rotational axis of the drive shaft, the drive shaft being disengageable from the actuator assembly and removable from the body through one of the openings in the body.

15. A depth control device as claimed in claim 14 wherein the actuator assembly comprises a module which is removably insertable into the body through an end of the body.

16. A depth control device as claimed in claim 14 wherein the actuator assembly includes a rotating portion having an opening through which the drive shaft passes and which has an inner periphery complementary in shape to an outer periphery of the drive shaft.

17. A depth control device for an underwater cable comprising:

a body;

a wing supported by the body for rotation about a pitch axis;

an actuator for rotating the wing about the pitch axis; and a magnet and a Hall effect sensor magnetically coupled to each other, one of the magnet and the Hall effect sensor movably supported with respect to the body so as to move in synchrony with the wing as the wing rotates about the pitch axis and the other of the magnet and the Hall effect sensor being stationary with respect to the body.

18. A depth control device as claimed in claim 17 wherein the Hall effect sensor is stationary with respect to the body.

19. A depth control device as claimed in claim 18 wherein the magnet is rotatable about the pitch axis.

20. A depth control device as claimed in claim 19 wherein the actuator includes a rotating portion which is rotatable about the pitch axis, and the magnet is mounted on the rotating portion.

21. A depth control device as claimed in claim 20 including a plurality of magnets mounted on the rotating portion and magnetically coupled to the Hall effect sensor.

22. A depth control device as claimed in claim 21 including a plurality of Hall effect sensors each magnetically coupled to a plurality of the magnets.

23. A depth control device as claimed in claim 22 wherein each Hall effect sensor generates an output voltage, and a combination of the output voltages of a plurality of the Hall effect sensors is approximately a linear function of an angle of rotation of the wing about the pitch axis.

24. A depth control device as claimed in claim 21 wherein the magnets include a pair of opposing magnets, and the Hall effect sensor is arranged to pass between the pair of magnets as the wing rotates about its pitch axis.

25. An underwater cable arrangement comprising:

a cable for being towed underwater;

a depth control device mounted on the cable for controlling a depth of the cable as the cable is towed underwater and comprising a rotary actuator having a rotating output shaft, a swash plate rotated by the output shaft and having a contact surface, a rocker arm having a rotational axis, a push rod having a first end engageable with the contact surface of the swash plate and a second end engageable with the rocker arm, and a first wing having a pitch axis and being operatively associated with the rocker arm such that rotation of the rocker arm about its rotational axis rotates the first wing about its pitch axis.

\* \* \* \* \*